United States Patent [19]

Annus

[11] 4,223,534
[45] Sep. 23, 1980

[54] PROCESS FOR TURBOCHARGING INTERNAL COMBUSTION ENGINES FOR HIGH ALTITUDE OPERATION AND THE TURBOCHARGED INTERNAL COMBUSTION ENGINE FOR PERFORMING SAID PROCESS

[75] Inventor: Imre Annus, Budapest, Hungary

[73] Assignee: Autoipari Kutato Intezet, Budapest, Hungary

[21] Appl. No.: 874,476

[22] Filed: Feb. 2, 1978

[30] Foreign Application Priority Data

Feb. 14, 1977 [HU] Hungary .............................. AU 372

[51] Int. Cl.³ ............................................. F02B 37/00
[52] U.S. Cl. .................................................... 60/611
[58] Field of Search ............... 60/600, 611; 123/119 C

[56] References Cited

U.S. PATENT DOCUMENTS

| 2,196,247 | 4/1940  | Browne et al. ......................... 60/600 |
| 2,559,623 | 7/1951  | Holmes .............................. 60/600 X |
| 2,684,569 | 7/1954  | Buchi ................................ 60/611 X |
| 2,811,826 | 11/1957 | Alcock ................................... 60/600 |
| 3,421,314 | 1/1969  | Michalke ................................ 60/611 |
| 3,568,435 | 3/1971  | May .............................. 123/119 C X |
| 3,913,542 | 10/1975 | Uitti et al. ............................. 60/611 |

FOREIGN PATENT DOCUMENTS

| 860572  | 12/1952 | Fed. Rep. of Germany ............. 60/611 |
| 2328494 | 1/1975  | Fed. Rep. of Germany ....... 123/119 C |

*Primary Examiner*—Michael Koczo
*Attorney, Agent, or Firm*—Young & Thompson

[57] ABSTRACT

Internal combustion engines are turbocharged by operating a turbocompressor with exhaust gases from an internal combustion engine. Compressed air is fed from the turbocompressor to the engine at a rate such that all the air compressed by the turbocompressor is fed to the engine when the engine is at the highest altitude for which the engine is designed and is operating at full load and is running at its lowest normal operating speed. But when the engine is operating at lower altitude and/or higher speed and/or at less than full load, then some of the air compressed by the turbocompressor is automatically discharged.

2 Claims, 4 Drawing Figures

PROCESS FOR TURBOCHARGING INTERNAL COMBUSTION ENGINES FOR HIGH ALTITUDE OPERATION AND THE TURBOCHARGED INTERNAL COMBUSTION ENGINE FOR PERFORMING SAID PROCESS

The invention relates to the turbocharging of an internal combustion engine, preferably to that of vehicles, for high-altitude operation and to the turbocharged engine itself, which is suitable to perform the process according to the invention, whose principal object is to compensate the loss of power resulting from reduced air pressure and specific gravity of the air when operating at high-altitude, particularly at lower speeds of revolution. Both in Diesel and in Otto engines, when operated in great heights above sealevel—compared to the output at sea-level—a significant loss of power can be observed. In the case of Otto engines, loss of power is proportional to the decrease in the specific gravity of the air. In Diesel engines loss of power shows different features, since in engines operating with a higher air excess factor loss of power will be less within certain limits with the increase of altitude, than in an engine operating with less air excess. In internal combustion engines at a height $H=5000$ m loss of power may amount to 50 to 55% or even to a higher percentage.

In vehicles regularly running on high-altitude routes or at various heights, a loss of power to the said extent is not permissible. In order to avoid it, both in Diesel and in Otto engines turbocharging has been applied.

By using the known turbocharging processes, in the range of nominal speeds of revolution of the engine, at a height of $H=5000$ m, compared to the value yielded in sea-level, loss of power can be kept within appr. 10% for a Diesel-engine and 25% for an Otto engine. Opposed to that, in the range of lower speeds of revolution f.i. in ranges belonging to the maximal torque (measured at sea-level) or below them, loss of power cannot be kept within said acceptable limits. In this case loss of power amounts to 30 to 40%, simultaneously the torque characteristics become inelastic and fuel consumption and smoke values increase.

Several methods and devices have been proposed, where turbochargers specially designed for the operation at a low atmospheric pressure have been used and regulated in accordance with the operational circumstances.

The technical solution described in the German Pat. No. 860,572 relates to the control of an Otto engine built into an airplane; in a closed state of the throttle valve serving for the regulation of speeds of revolution, the controlling device sensing the differential pressure before and after and throttle valve opens the blow-off valve behind the turbocompressor, thus it can be avoided that the turbocompressor should reach the pumping limit. This operational state occurs with a turbocompressor driven mechanically from the engine.

In the German Pat. No. 1,751,061 control of the turbocharger (driven by the exhaust gas turbine) in a wider range of speeds of revolution than before has been proposed for Otto-engines, to be realized by discharging a part of the air delivered by the turbocompressor. When load is reduced rapidly, as well as within the lowest operational and in the ranges of the nominal speeds of revolution, the discharging valve opens and as a consequence a part of the air delivered by the turbocharger is discharged in the open air or led back to the induction manifold of the turbocompressor.

In the solution described in the German Pat. No. 2,613,396 the differential pressure between the induction manifold and the pressure side is used for controlling purposes, where regulation of the air quantity takes place by altering the speed of revolution of the turbocharger by means of the by-pass exhaust manifold arranged before the turbine and to be closed by means of a valve.

Although both regulating devices are sensing the environmental air pressure and even take it into consideration in course of the regulation, neither the turbocharger, nor the regulator have been adjusted for the compensation of the loss of power, occurring at great heights, they are not suitable for performing such a task and also both are rather complicated.

The vane-ring with the adjustable vane angle represents an even more complicated and expensive solution; although it can be regulated in dependence on the altitude, its application in automobiles—due to the high expenses and insufficient compliance with the requirements—does not seem possible.

The object of our invention is partly to compensate the loss of power of the engine when operated under high-altitude conditions and to reach possibly the power values yielded at sea-level within the range of the nominal speed of revolution, partly to achieve a better compensation within the ranges of lower speeds of revolution, simultaneously ensuring economical operation under normal atmospheric circumstances (at sea-level, $H=0$).

In accordance with the invention this object is achieved by using a turbocharger for the internal combustion engine, in which at the highest altitude above sea-level, in the range of the lowest speed of revolution suitable for normal operation, when power and torque are completely compensated, the air delivered by said turbocharger equals the fresh air consumption of the engine and under any operational condition differing from that described before (speed of revolution of the engine, altitude, load), when the charging pressure of the fresh air delivered by the turbocharger reaches a predetermined permissible value, said charging pressure is automatically kept at said value by discharging excess air. In accordance with our invention the engine can be operated under the usual operational conditions and the quantity of the fresh air discharged does not exceed—even in the most unfavourable cases—20 to 25% of the entire air quantity delivered by the turbocharger.

Our invention relates to a process for turbocharging internal combustion engines for high-altitude operation, in the course of which over a part of the operational range the fresh air quantity delivered by the turbocompressor is partly discharged by means of an automatic valve; with the internal combustion engine a turbocharger is used, in which at the highest operational altitude above sea-level, under full load and in the range of lowest speed of revolution suitable for normal operation, the air quantity delivered by the turbocharger equals the fresh air consumption of the internal combustion engine and under different operational conditions and at different speeds of revolution, as well as at higher altitudes the excess air is discharged by means of the automatically operating regulating valve, which is adjusted to the maximum permissible overcharge pressure determined for the greatest operational height above sea-level, representing the threshold value.

In accordance with our invention in a Diesel engine, up to the permissible maximal combustion peak pressure, a maximum overcharge pressure changing in a direct proportion to the change in atmospheric pressure is permitted, while in the case of an Otto engine the permissible maximum overcharge pressure is kept at an approximately constant value by compensating the changes of the atmospheric pressure within the detonation limit.

In a turbocharged internal combustion engine for performing the process according to the invention, a turbocharger is used, in which at the highest operational altitude above sea-level, at the full load of the internal combustion engine and at the lowest speed of revolution suitable for normal operation the air quantity delivered by the turbocharger equals the fresh air consumption of the engine and in the system feeding in the fresh air and arranged between the turbocompressor and the cylinders there is a regulating valve for the discharge of the excess air delivered by the turbocompressor, furthermore there is an element for controlling said valve and sensing the prevailing pressure, the reacting threshold value for which represents the maximum permissible overcharge pressure determined for the highest altitude above sea-level.

In accordance with our invention, in a Diesel engine the closing element of the regulating valve controlled by the overcharge pressure and serving for the discharge of excess air is loaded by a spring; on said closing element there are two walls arranged behind each other and separating the spaces of the valve housing in a sealing manner; the walls can to be displaced and one of them separates the space at atmospheric pressure from the space at overcharge pressure, whereas both sides of the other wall are arranged in the space where overcharge pressure prevails. The effective surface of the side lying in the direction of the valve seat is greater, than the effective surface of the other side; the spring loading the closing element is prestressed by means of the element arranged in the valve housing—ensuring changeable prestressing—which is preferably a threaded set screw.

In accordance with our invention, in an Otto engine the closing element of the regulating valve controlled by the overcharge pressure and serving for the discharge of excess air is loaded by a spring; on said closing element there are two displaceable walls arranged behind each other and separating the spaces of the valve housing in a sealing manner; one of the walls separates the space at atmospheric pressure from the space at overcharge pressure, whereas both sides of the other wall are arranged in the space where overcharge pressure prevails. The effective surface of the side lying in the direction of the valve seat is greater, than the effective surface of the other side; the other end of the spring bearing against the closing element bears up against the movable wall of the closed-spaced pressure casing; the spring loading the closing element is prestressed by means of the element arranged in the valve housing and bearing against the wall of the pressure casing—ensuring changeable prestressing—which is preferably a threaded set screw.

In Otto-engines, by the suitable selection of the surface of the pressure casing and the differential piston different control characteristics can be achieved.

The change of the extent of the prestressing force exerted on the spring by the pressure casing with the movable wall preferably equals the change in force corresponding to the change in air pressure on the surface of the differential piston loaded by the atmospheric air pressure.

By the application of the turbocharging process according to the invention it can be achieved that the output yielded at sea-level (H=0 m) can be reached over the entire operational range of speed of revolution of the internal combustion engine even when operated at high-altitude.

In Diesel engines smoke properties do not become worse when operational height increases. In the case of Otto engines, when the operational altitude decreases, detonation cannot be observed in spite of the compensation of loss of power, simultaneously—when operated on sea-level—compared to turbocharged engines without regulating valves, torque-elasticity properties of the engine also improve.

The process according to the invention and the engine charged in accordance with said process are described in detail by means of two preferred embodiments, in one example describing a Diesel-engine and an Otto-engine in the other.

The invention will be described by means of the drawings enclosed, where

Figure 3:
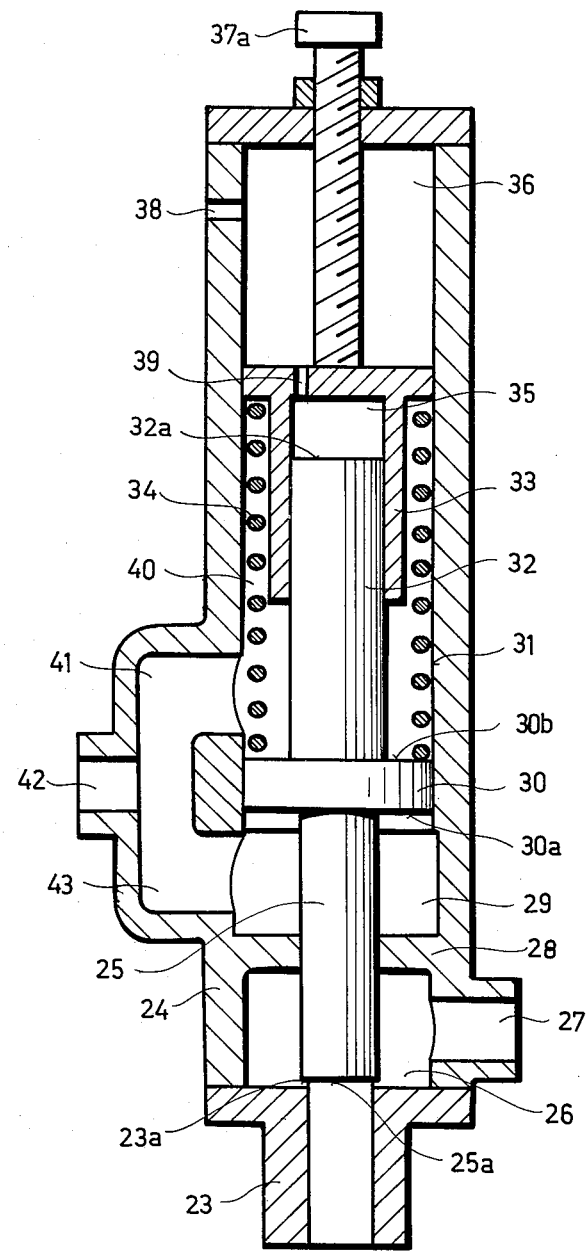
Figure 4:
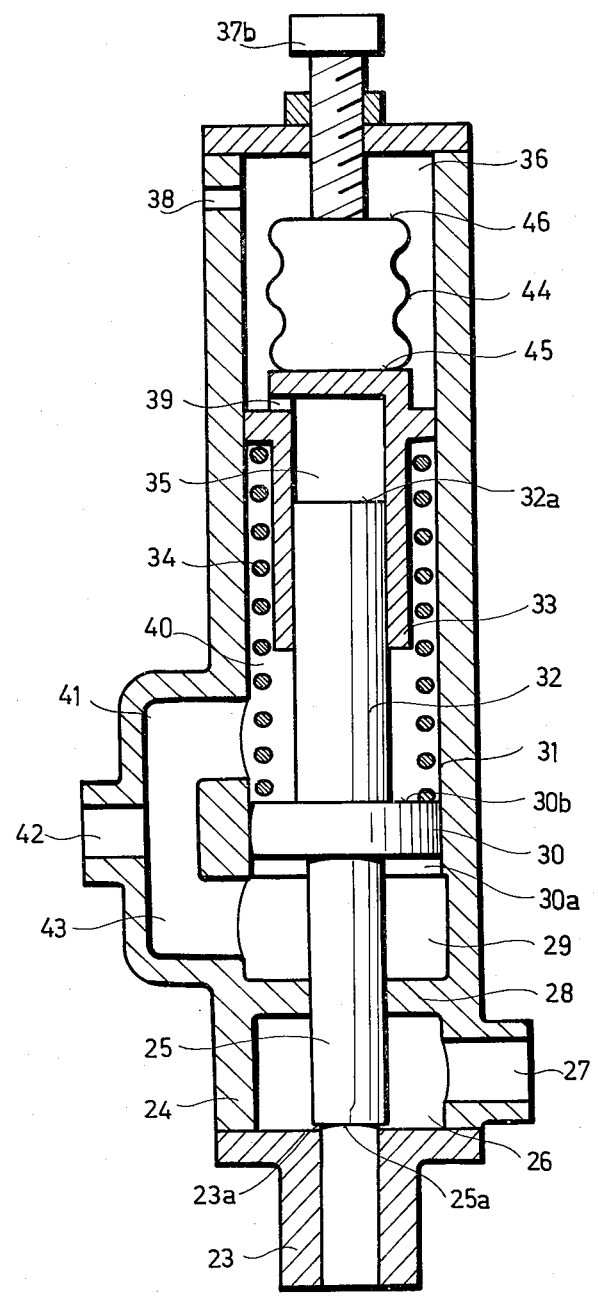

FIG. 3 a sectional view of the valve of a Diesel-engine regulating the quantity of fresh air;

FIG. 4 a sectional view of the valve of a turbo-charged Otto-engine regulating the quantity of fresh air.

Figure 1:
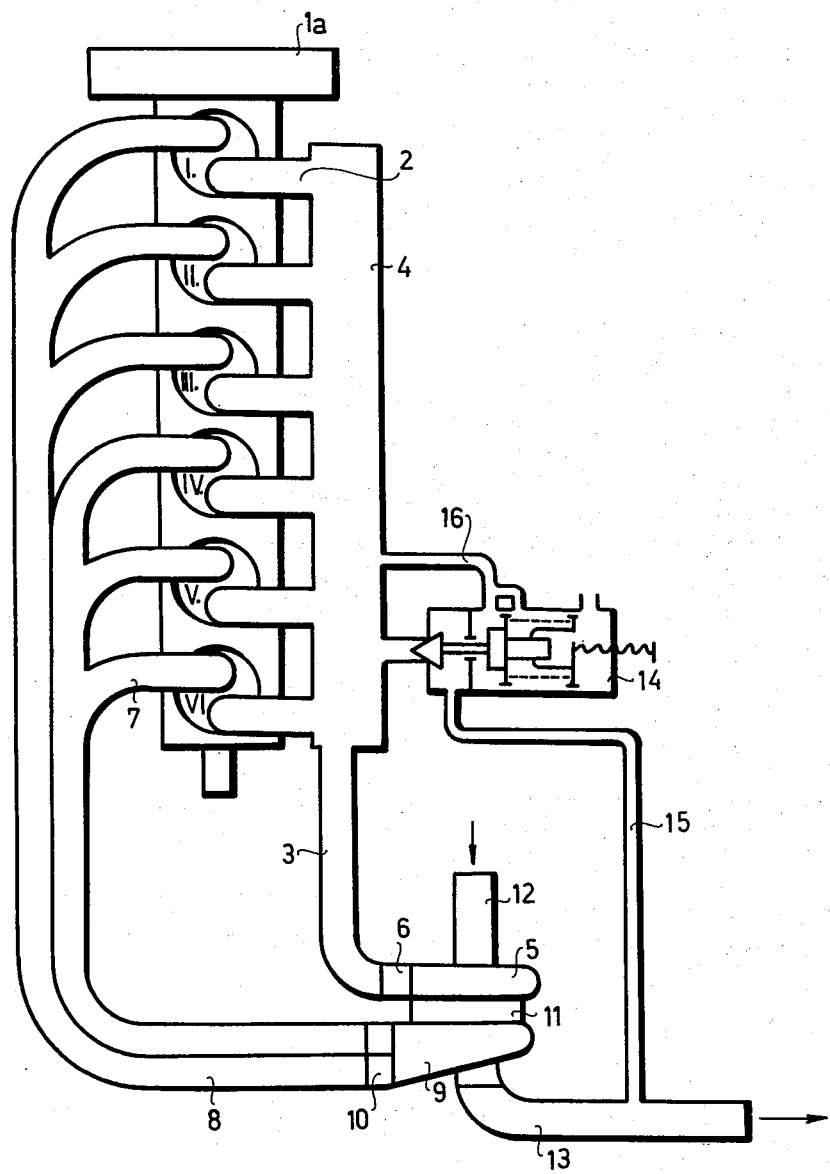
FIG. 1 is shows the arrangement of a turbo-charged Diesel-engine for high-altitude operation.

In FIG. 1 the arrangement of the six cylinder inline Diesel-engine is illustrated schematically. The cylinders I–VI are connected through the suction pipes 2 to the common induction manifold 4, the latter being connected through the pressure pipe 3 with the pressure outlet 6 of the turbocompressor 5. Three each of the exhaust manifolds 7 of the cylinders I–VI discharge in one exhaust manifold 8 both of which are connected to the inlet 10 of the exhaust gas turbine 9. The turbocompressor 5 and the exhaust gas turbine 9 are mounted on a common shaft, thus the turbocharger 11 is one single unit. The turbocompressor 5 is provided with suction pipe 12 delivering fresh air, and the outlet of the turbine 9 is connected to the exhaust manifold 13. In the common induction manifold 4 of the system feeding in the fresh air the regulating valve 14 is arranged, the inner space of which has been formed as a pressure sensing element and is connected to the common induction manifold 4 through the conduit 16. The regulating valve 14 is adjusted to a predetermined permissible maximum charge pressure; when the value is reached, said valve discharges the excess air delivered by the turbocharger 5; for the outlet of the excess air the regulating valve 14 is connected to the exhaust manifold 13 through the conduit 15. The regulating valve is shown in a sectional view in FIG. 3. The lower cover 23 is connected to the common induction manifold 4, on which the valve seat 23a has been formed. The closing element 25 bears against the valve seat 23a with its front end 25a. The closing element 25 is formed as a differential piston, simultaneously functioning as a pressure sensing element and being led in a sealed manner in the bore of the partition 28 and the bore 31 of the valve housing 24.

In the valve housing 24 four spaces are formed in the sequence as follows: the blowing-off space 26 enclosing the valve seat 23a and provided with the connecting stud 27, the space 29—separated from the former space by means of the partition 28—in which the charging pressure prevails, confined by the side 30a of the flange 30 of the closing element 25, as well as the space 40 in which the charging pressure prevails and which is confined by the side 30b of the flange 30 from one side and by the sleeve 33 on the other side, in the fourth space 35, 36 the atmospherical pressure prevails, one confining wall is limited by the end 32a of the cylindrical shank 32 of the closing element 25 and the sleeve 33, the latter being disposed in the bore 31 about the cylindrical shank 32. The bore 39 formed in the sleeve 33 ensures a continuous connection between the spaces 35 and 36. The space 36 stays in a permanent connection with the atmosphere through the bore 38 formed in the valve housing 24. The spaces 29 and 40—in which the charging pressure prevails—are provided with the common connection stud 42 connected to the space 29 by means of the channel 43 and to the space 40 by means of the channel 41. The closing element 25 is loaded by the spring 34 being supported by the side 30b and the sleeeve 33. Prestressing of the spring 34 can be performed by means of the set bolt 37a supported by the sleeve 33. As between the surfaces 30a and 30b arranged in the spaces where identical pressures are prevailing, the surface 30a is greater, as of which a force will be here generated compelling the closing element 35 in the opening direction.

In accordance with the process according to the invention a turbocharger 11 is used with the engine 1a, at which at the highest planned operational altitude (f.i. H=5000 m), in the range of the lowest number of revolutions of the engine suitable for normal operation the air quantity delivered by the turbocharger equals the fresh air consumption of the engine 1a; the said range of numbers of revolutions is, for a Diesel-engine with the nominal speed of 2200–2400 r.p.m. in the range between 1200 and 1400 r.p.m. Under the fresh air consumption the air quantity is to be meant which is to be fed in into the engine in order to reach the predetermined combustion peak pressure i.e. the resulting brake mean effective pressure.

By increasing the number of revolutions of the engine, the air quantity delivered by the turbocharger 11 and the pressure ratio will also increase and the charging pressure rapidly reaches the predetermined permissible maximum value.

After having reached the predetermined maximum permissible charging pressure value, a part of the fresh air delivered by the turbocharger 11 is discharged through the pressure sensing regulating valve 14 arranged in the system feeding in the fresh air as long as the charging pressure is reaching the permissible maximum value.

When operation is taking place below the maximum planned operational altitude, the charging pressure will reach its predetermined maximum permissible value at a lower number of revolutions, in this case the quantity of the fresh air to be discharged is larger, than at the highest operational altitude. At a height H=0 m (at sea-level) the fresh air quantity to be discharged amounts to maximally 20% of the air quantity delivered by the turbocharger 11.

In Diesel-engines, when elevation decreases, a charging pressure surpassing the predetermined maximum permissible charging pressure determined for the highest operational altitude is also permitted, since when the fuel quantity injected during the single cycles is kept at a constant valve, the excess air factor of the engine will be increased as is permissible within certain limits, the more, for certain engines it can be considered as advantageous.

The turbocharging process according to our invention can be applied at any internal combustion engine at any number of cylinders.

The preferable embodiment of the Diesel-engine suitable for performing the process according to the invention may be seen in FIGS. 1 and 3. In the aforementioned the schematical illustration has been described.

According to the invention the engine 1a and the turbocharger 11 are co-ordinated with each other in such a manner that at the maximum planned operational altitude, in our example H=5000 m, in the range of the lowest number of revolutions which is suitable for normal operation the air quantity delivered by the turbocharger 11 equals the fresh air consumption—already defined in connection with the description of the process—of the internal combustion engine. In a Diesel-engine of a vehicle, where the range of the nominal number of revolutions lies between 2200 and 2400 r.p.m. the lowest number of revolutions which is suitable for normal operation lies in the range between 1200 and 1400 r.p.m.

The apparatus according to our invention and illustrated in FIGS. 1 and 3 operates as follows.

The exhaust gases of the engine 1a are led by the exhaust manifolds 7 and 8 into the turbine 9 of the turbocharger 11 from which the exhaust manifold 13 discharges the gases into the atmosphere. The turbocompressor 5 driven by the turbine 9 sucks in the fresh air via the induction manifold 12, through the air filter not illustrated here, while the compressed air arrives through conduit 3 into the common induction manifold 4 and through the suction pipes 2 to the cylinders I–VI. In the spaces 29 and 40 of the regulating valve 14 and in the common induction manifold 4 pressures of identical magnitude prevail. As a result the closing element 25 rises from the valve seat 23a and lets fresh air into the blow-off space 26, when the pre-stressing force of the spring 34 is surpassed by the resultant of the forces generated on the end 25a loaded by the charging pressure, and the opposed surfaces 30a and 30b and 32a. In practice the regulating valve 14 keeps the value of the charging pressure adjusted by means of a prestressed spring 34 within 3–4%; the discharge of fresh air complies with said value. From the blow-off space 26 the fresh air discharged is led through the conduit delivering fresh air into the exhaust mainfold 13 in order to dilute the exhaust gases. The opening pressure value i.e. threshold valve of charging pressure of the regulating valve 14 can be adjusted by means of the set bolt 37a. Taking into consideration that the side 32a determining the state of equilibrium of the closing element 25 is always loaded by the prevailing atmospherical pressure, the response threshold value of the regulating valve 14 will always depend on the operational altitude. By decreasing the altitude, the threshold value will increase. In a Diesel-engine the increase is permitted, since only the excess air factor will increase, when the fuel quantity injected in the single cycles is not increased and we do not surpass the permissible combustion peak pressure.

Figure 2:
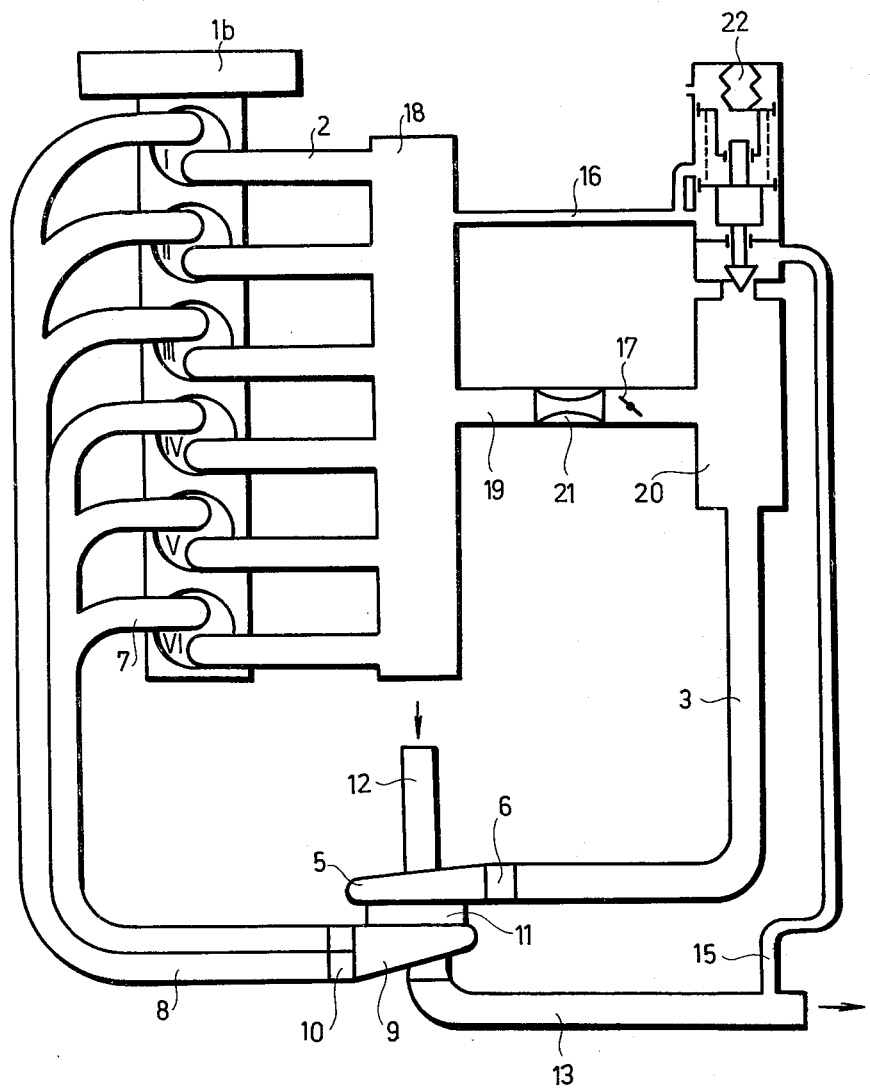
FIG. 2 illustrates the arrangement of a turbo-charged Otto-engine for high-altitude operation.

Application of the process according to the invention will next be described in detail in relation to an Otto-engine by means of the FIGS. 3 and 4. In FIG. 2 the schematical arrangement of a turbocharged six-cylinder in-line Otto-engine may be seen. The exhaust system and the turbocharger 11 of the Otto-engine 1b illustrated in said figures are identical to those described in connection with the Diesel-engine, whereas the system feeding in fresh air has different features. The pressure outlet 6 of the turbocompressor 5 is connected to the receiver 20 through the pressure pipe 3, said receiver being connected to the common induction manifold 18 by means of the induction manifold 19, in which the throttle valve 17 and the atomizer 21 are arranged. The common induction manifold is connected to the cylinders I–VI through the suction pipes 2. On the receiver 20 the regulating valve 22 has been arranged, the spaces of which—with a prevailing pressure below the charging pressure—are connected to the common induction manifold 18 through the conduit 16, the blow-off space being connected to the exhaust manifold 13 by means of the conduit 15. The regulating valve 22 is illustrated in a diagrammatical section in FIG. 4. With the exception of two components the regulating valve 22 is identical to that described before i.e. to the regulating valve 14, described in connection with FIG. 3. In the regulating valve 22 the pressure casing 44 can be considered as a new element, the movable wall 45 of which is supported by the sleeve 33, the wall 46 by the set bolt 37b. The pressure casing 44 with a closed space serves for sensing the atmospherical pressure, the length of which—determined by the walls 45 and 46—varies in dependence on the atmospherical pressure; upon a drop in the pressure the length of the pressure casing increases. The pressure casing incorporated in the regulating valve 22 increases the prestressing force exerted on the spring 34 proportionally to the increase of the altitude above sea-level, as a consequence the response threshold value of the regulating valve 22 may be rendered independent of the altitude.

In accordance with the process according to the invention a turbocharger was applied to the Otto-engine 1b, at which at the highest planned operational altitude above sea-level (in our example H=5000 m) in the range of the lowest number of revolutions suitable for normal operation, the air quantity delivered by the turbocharger equals to the fresh gas consumption of the engine 1b. In an engine of a cylinder capacity of 6 l and at a nominal number of revolutions of 3200 r.p.m. this range lies between 1800 and 2000 r.p.m. As the fresh gas consumption of the engine is meant the quantity of the mixture of fuel and air which can be fed into the engine by taking the permissible thermal load, mechanical load and limit value of detonation into consideration. When the number of revolutions of the engine 1b is increased, the quantity of air delivered by the turbocharger 11, as well as the pressure ratio will also increase, as a consequence, charging pressure rapidly reaches the predetermined maximum value. As soon as the pressure of the fresh air delivered by the turbocharger 11 reaches the predetermined maximum value, a part of the fresh air delivered is discharged through the regulating valve 22 arranged in the fresh gas system and to such an extent that charging pressure should reach the predetermined maximum value.

When operated in a height below the planned highest operational altitude, the regulating valve discharging the fresh air will open at a lower number of revolutions in dependence on the change in the specific weight of the atmospherical air. As a consequence, during operation at sea-level (H=0 m) the quantity of the fresh air to be discharged is larger, than that discharged at higher operational altitudes. The quantity of the fresh air to be discharged equals at most 25% of the air quantity delivered by the turbocharger 11. When applying the process according to the invention, the injecting nozzle or the fuel atomizer can be arranged within the fresh gas system in the passage between the regulating valve 22 and the cylinders (I–VI) of the engine only.

The preferable embodiment of the Otto-engine suitable for performing the process according to the invention is to be seen in FIGS. 2 and 4. In the aforementioned the diagrammatical section has been described.

In accordance with our invention the turbocharger 11 and the engine 1b are co-ordinated in such a manner, that at full load of the engine 1b, at the planned highest operational altitude (in our example H=5000 m) and in the range of the lowest number of revolutions suitable for normal operation the air quantity delivered by the turbocharger 11 equals the fresh gas consumption—defined in connection with the description of the process—of the engine 1b. In the Otto-engine of a lorry, where the nominal number of revolutions amounts to 3200 r.p.m. the range of the lowest number of revolutions suitable for normal operation, which is below the detonation limit, lies between 1800 and 2000 r.p.m.

The equipment according to the invention and illustrated in FIGS. 2 and 4 operates as follows.

The exhaust gases of the engine 1b are led through the exhaust manifolds 7 and 8 into the turbine 9 of the turbocharger 11. The turbocompressor 5 driven by the turbine 9 takes in the fresh air through the suction pipe 12 delivering fresh air, through the air-filter not illustrated here, whereas the compressed air is pressed into the receiver 20. In dependence on the position of the regulating valve 22 the fresh air is led—partly or in its entirety—through the suction pipe 19, the atomizer 21 into the common induction manifold 18 and arrives through the suction pipes 2 into the cylinders I–VI. The capacity of the engine is controlled by means of the throttle valve 17. In the spaces 29 and 40 of the regulating valve 22 and in the common induction manifold 18 a pressure of identical magnitude prevails. As a consequence, the closing element 25 arises from the valve seat 23a and discharges fresh air into the blow-off space 26 but only when the force prestressing the spring 34 is surpassed by the resultant of the forces generated on the end 25a loaded by the charging pressure, on the difference of the sides 30a and 30b and on the end 32a. In practice, the regulating vlave 22 keeps the pressure value adjusted by means of the set bolt 37b within 3–4%, and the quantity of the air discharged complies with said value. The fresh air discharged from the blow-off space 26 is led through the conduit 15 into the exhaust manifold 13, where dilution of the exhaust gases takes place. The response threshold value—responding to the charging pressure—of the regulating valve 22 may be adjusted by means of the set bolt 37b. The pressure casing 44 with the closed space corrects the response threshold value in dependence on the atmospherical pressure, whereby the extent of correction will be determined by the characteristics of the pressure casing 44 with the closed space.

The prevailing atmospherical pressure exerts an influence on the end 32a of the closing element 25; in order to keep the response threshold value (absolute value) at a constant level, a pressure casing 44 has been selected, the characteristics of which approximate the change in pressure due to change in altitude, and by this it can be avoided that at the decrease of the operational height detonation should occur in the engine 1b. In dependence on the characteristics chosen of the pressure casing 44 with closed space depending on the altitude and atmospherical pressure, respectively, a regulating valve 22 giving alternating response threshold values can also be used and co-ordinated with the air consumption of a given engine. Such a solution might be useful also in Diesel engines, when simultaneously with the decrease of operational height the engine reaches the permissible combustion peak pressure; in this case the application of a regulating valve sensitive to the atmospherical pressure and provided with the pressure casing 44 seems to be expedient.

What we claim is:

1. In combination, an internal combustion engine and a turbocompressor driven by exhaust gases from the engine to feed compressed air to the engine, means for passing all of the air from the turbocompressor passing to the engine when the engine is at the highest altitude for which the engine was designed and is operating at full load and is running at its lowest normal operating speed, and valve means responsive to at least one of lower altitude and higher engine speed and less than full engine load automatically to discharge some of the air compressed by the turbocompressor, said valve comprising a valve housing (24) and a valve member (25) disposed in said valve housing, spring means (34) normally urging said valve toward closed position, said valve member having three piston surfaces thereon, a first one (32a) of which is exposed to the atmosphere, and second and third ones (30a, 30b) of which face in opposite directions, said second piston surface being larger in area than said third piston surface and both of said second and third piston surfaces being exposed to the supercharged pressure delivered by said supercharger, said spring means acting in opposition to the pressure exerted by said supercharged pressure on said second piston surface, and a sealed bellows acting against said spring means, the outside of said bellows being exposed to ambient pressure.

2. Apparatus as claimed in claim 1, and means acting against the sealed bellows adjustably to prestress said spring means.

* * * * *